(12) United States Patent
Zoorob

(10) Patent No.: US 11,877,534 B1
(45) Date of Patent: Jan. 23, 2024

(54) REAR TO CENTER FRAME ATTACHMENT MECHANISM FOR A ZERO-TURN MOWER

(71) Applicant: Rabih Zoorob, Garden Ridge, TX (US)

(72) Inventor: Rabih Zoorob, Garden Ridge, TX (US)

( * ) Notice: Subject to any disclaimer, the term of this patent is extended or adjusted under 35 U.S.C. 154(b) by 0 days.

(21) Appl. No.: 16/908,058

(22) Filed: Jun. 22, 2020

Related U.S. Application Data

(63) Continuation-in-part of application No. 16/389,930, filed on Apr. 20, 2019, now abandoned.

(51) Int. Cl.
*A01D 34/64* (2006.01)
*A01D 34/00* (2006.01)
*A01D 101/00* (2006.01)

(52) U.S. Cl.
CPC ........... *A01D 34/001* (2013.01); *A01D 34/64* (2013.01); *A01D 2101/00* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,085,504 A | * | 7/2000 | Wright | B62D 51/02 56/14.7 |
| 6,832,657 B1 | * | 12/2004 | LaFlair | A01B 45/02 172/540 |
| 8,752,855 B2 | * | 6/2014 | Dilworth | A01B 59/064 280/481 |
| 2004/0079560 A1 | * | 4/2004 | Hammonds | B66F 9/07545 180/6.48 |
| 2006/0096133 A1 | * | 5/2006 | Sanders | A01D 42/08 37/241 |
| 2018/0064030 A1 | * | 3/2018 | Hoppel | A01D 43/02 |

* cited by examiner

*Primary Examiner* — Ronald P Jarrett
(74) *Attorney, Agent, or Firm* — Richard Eldredge; Leavitt Eldredge Law Firm

(57) ABSTRACT

A zero-turn mower including a removably attached front-end loader, where front-end loader includes two boom arms and a bucket, and an attachment mechanism. The attachment mechanism may include a center plate, a loader attachment mechanism, and a mower attachment mechanism.

2 Claims, 6 Drawing Sheets

REAR TO CENTER FRAME ATTACHMENT MECHANISM FOR A ZERO-TURN MOWER

REFERENCE TO PRIOR APPLICATIONS

This application is a continuation-in-part application of U.S. Non-Provisional patent application Ser. No. 16/389,930 entitled "Rear to Center Frame Attachment Mechanism for a Zero-Turn Mower." That application claims benefit to U.S. Provisional Patent Application Ser. No. 62/632,558, filed Feb. 20, 2018, entitled "Attachment Mechanism for Connecting a Front-end Loader to a Zero-turn Mower." The entire content of both applications is incorporated herein by reference.

BACKGROUND

Field of the Disclosure

The present invention relates generally to attachments to riding lawn mowers and more particularly, to a front-end loader attachment for a zero-turn mower.

Background

Front-end loaders are typically heavy, and do not distribute their weight very evenly. Thus, front-end loaders, if they are attached to smaller vehicles, cause the smaller vehicles to tip over with or with an included payload. As a result, front-end loaders are only used with four-wheel-drive ATVs, tractors or other larger vehicles that can support a front-end loader's weight and distribute that weight over four powered wheels. In other words, these vehicles have sufficient strength and balance to support a front-end loader with or without an included payload in the front-end loader's bucket.

However, there is a need to attach front-end loaders to small vehicles that are easier to operate, more maneuverable, and cost less. Despite this need, currently, there is no mechanism to reliably attach a front-end loader to a smaller vehicle without making the vehicle difficult to operate, potentially dangerous, and prone to tipping over.

BRIEF SUMMARY

A highly maneuverable vehicle including a front-end loader attachment, including a zero-turn mower, a front-end loader including two boom arms and a bucket, and an attachment mechanism. This attachment mechanism may include a center plate, a loader attachment mechanism, and a mower attachment mechanism.

BRIEF DESCRIPTION OF THE DRAWINGS

The detailed description is set for with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION OF THE PREFERRED EMBODIMENT

Figure 1A:
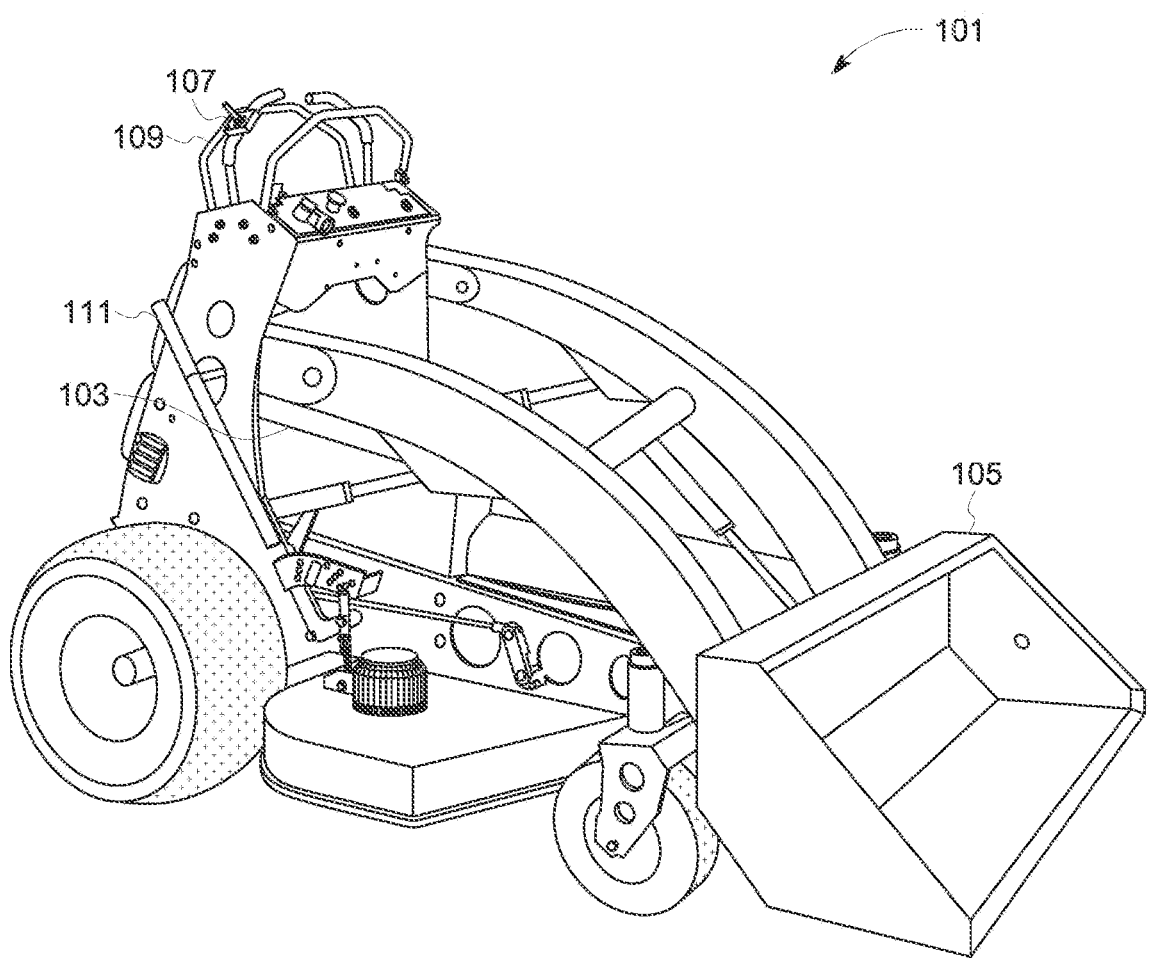
FIGS. 1A and 1B are side perspective views of a zero turn mower in accordance with the present application.

The present invention described herein is a zero-turn mower with a front-end loader attached it. Moreover, the present invention described herein is also for an attachment mechanism for connecting a front-end loader to a zero-turn mower in a reliable manner that does not impair the maneuverability of the zero-turn mower, and does not cause the zero-turn mower to tip over.

The present invention solves the problems that are typically associated with attaching a front-end loader to a small zero-turn vehicle, including, but not limited to reduced maneuverability, tip-over issues, increased risk/danger, etc. The attachment mechanism described herein solves these problems by distributing the weight of the front-end loader, with or without a payload in the front-end loader's bucket, across an appropriate length and width of the zero-turn mower, and reducing the center of gravity of the entire apparatus.

Moreover, the attachment mechanism does not interfere with the mowing mechanism on the zero-turn mower and does not impair the mower's ability to mow. The inventive attachment mechanism also does not reduce the usable workspace and leg room that may be otherwise available on the top deck of a zero-turn mower. The attachment mechanism also enables the front-end loader to connect with the zero-turn mower's battery, thereby eliminating the need to include multiple batteries and maintain them.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can", "could", "might", or "may", unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

It will be understood that the invention of the present disclosure could include any type of zero-turn mower and that a ride-on, stand-on, or sit-on mower could be used. It is contemplated that by attaching a tool in a safe and stable manner the mower is converted to a skid steer to deliver material across a lawn without tearing it and thereby fulfill multiple purposes and functions.

There is a need in the lawn care industry for an improved device or machine to transport materials such as mulch or topsoil across the turf without tearing or harming the grass. Commonly, this is accomplished by a wheelbarrow or shovel. While previous attempts have been made to attach such a tool to a zero-turn mower generally the result has been unsatisfactory due to the implements being attached to the front of the mower. These attempts create and unstable platform with extremely limited use.

Figure 1B:
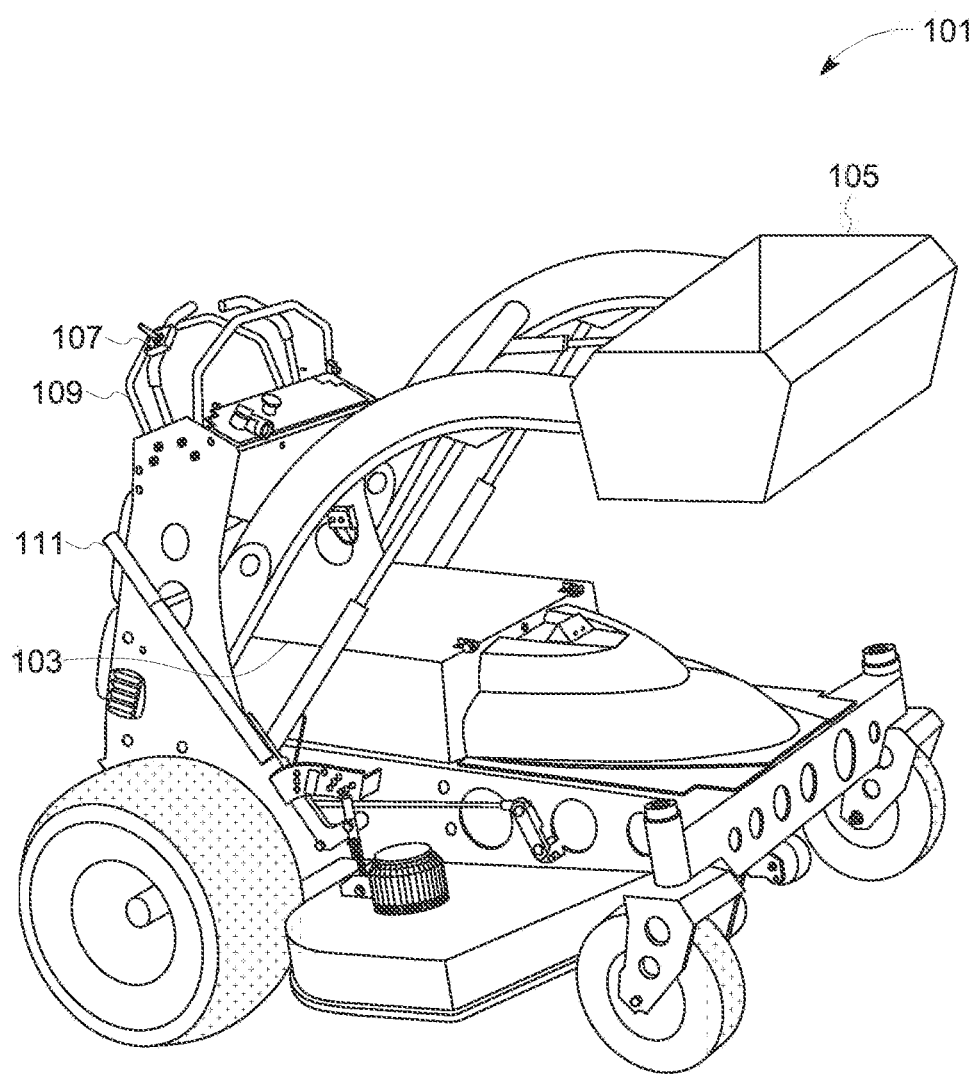

Referring to FIGS. 1A and 1B where an alternative embodiment is depicted. In the contemplated embodiment, the system 101 includes a ride-behind mower 103 with a tool 105 depicted as a front-loader removably attached to the structure 111 thereof via a joint. A control 107 is attached to a handle 109 of the mower and is configured to operate, manipulate, or otherwise control the tool 105. The joint is contemplated to place the center of gravity of the system 101 so as to limit or reduce the possibility of tip-overs or the like. In this embodiment is contemplated that the joint consists of four points two on each side, one high and the other low. It is contemplated that the joint allows the tool 105 to be attached at the center or midpoint of the mower and towards the rear there of as well. It is contemplated that the tool 105 could be joined to the mower through fasteners, clips, pins, mounting plates, brackets, quick hinges or the like.

With the tool 105 attached in the middle or at the rear the frontend loader the lift arms gain height, leverage to improve the range of use of the bucket. Additionally, the attachment configuration increases traction to the mower by altering the weight distribution of the system 101 as a whole.

In the preferred embodiment the tool 105 is a front-end loader. The font-end loader is contemplated to have two lift arms attached and secured to the rear of the frame of the mower. Each lift arm has a hydraulic ram connected thereto. A hydraulic pump powers the hydraulic rams to move the arms up and down. The hydraulic pump could be powered by an electric battery or the power take-off of a gas engine. The lift arms could be secured to the frame, chassis, roll bar, or incorporated onto the rear of the mower. The front-end loader also has a singular or double hydraulic ram secured to a cross bar near the center of the lift arms to control the front end-loader bucket.

In use, the tool 405 is selected and attached to the structure 111 of the ride-behind mower 103 via the joint. The ride-behind mower 403 and tool 405 are then moved to the location where the tool 105 is needed under the power of the ride-behind mower 103. The control 107 is then used to operate the tool 105 with the aid of the mower as needed to accomplish the work to be done.

It is contemplated that the control 107 could be any form of interface such as buttons, a joystick, a remote, software application or the like. The intent is that the tool 105 is operable.

It should be appreciated that one of the unique features believed characteristic of the present application is that the joint allows for the attachment and removal of tool 105 to and from a ride-behind mower 103. The tool 105 allows the ride-behind mower 103 to function in additional roles so that a single piece of machinery can be used in the place of several.

Figure 2:
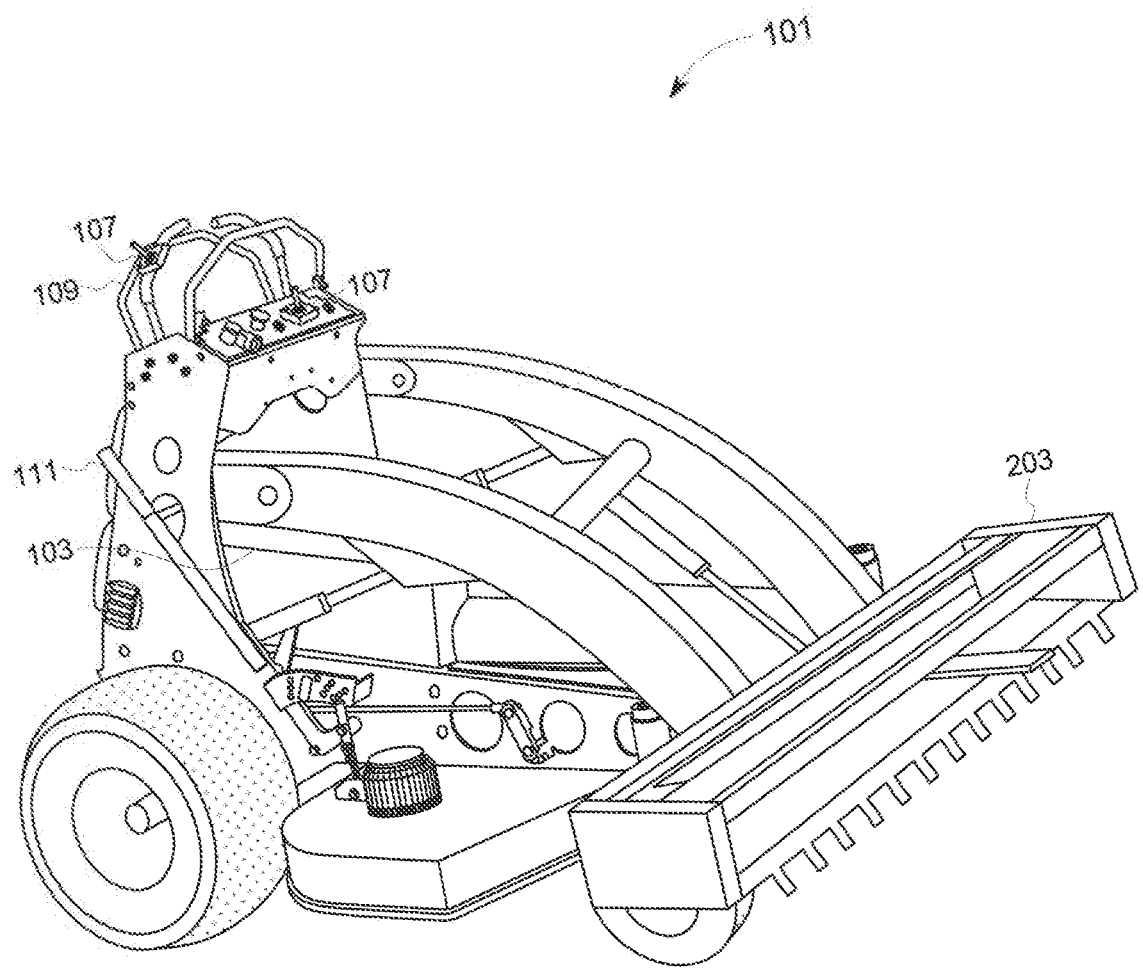
FIG. 2 is a side perspective view of the invention of FIGS. 1A and 1B.

It is contemplated that while the tool is depicted as a front loader attachment other tools could be used. Referring now to FIG. 2 an alternative embodiment of the tool is depicted. FIG. 2 includes a scraper 203 attached to the ride-behind mower 103 via the joint. It is contemplated that the tool could be any implement that is used to care for or maintain a yard space such as an aerator, snowplow or the like.

Figure 3:
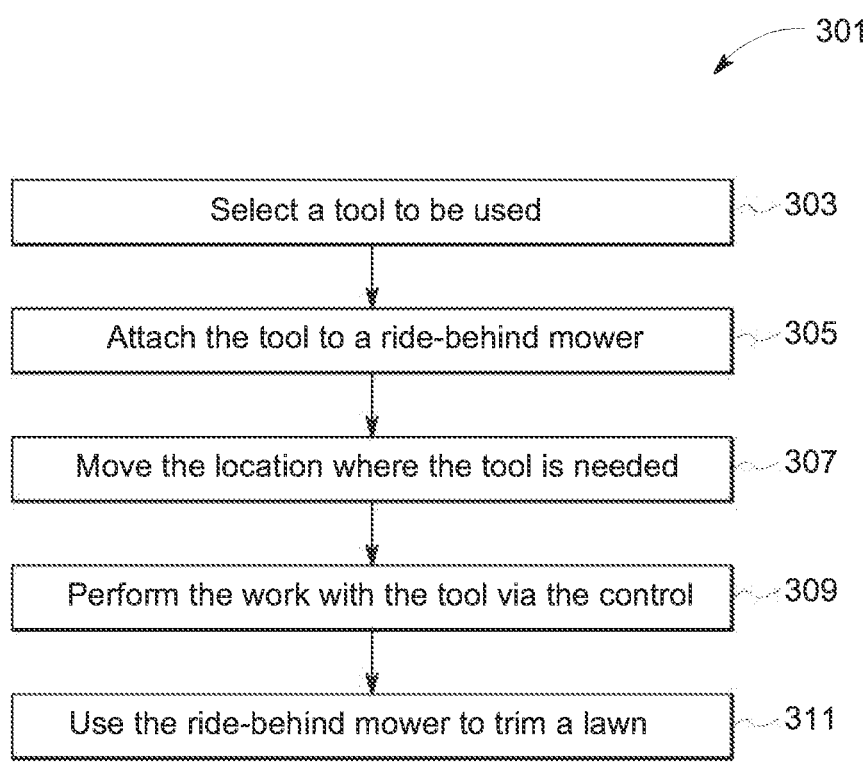
FIG. 3 is a flowchart of a method of using a front-end loader.

A method of transforming a mower is depicted by FIG. 3. Method 301 includes selecting a tool to be used 303, attaching the tool to a ride-behind mower 305, moving to the location where the tool is needed 307, performing work with the tool via the control 309 and using the ride-behind mower to trim a lawn 311.

Figure 4:
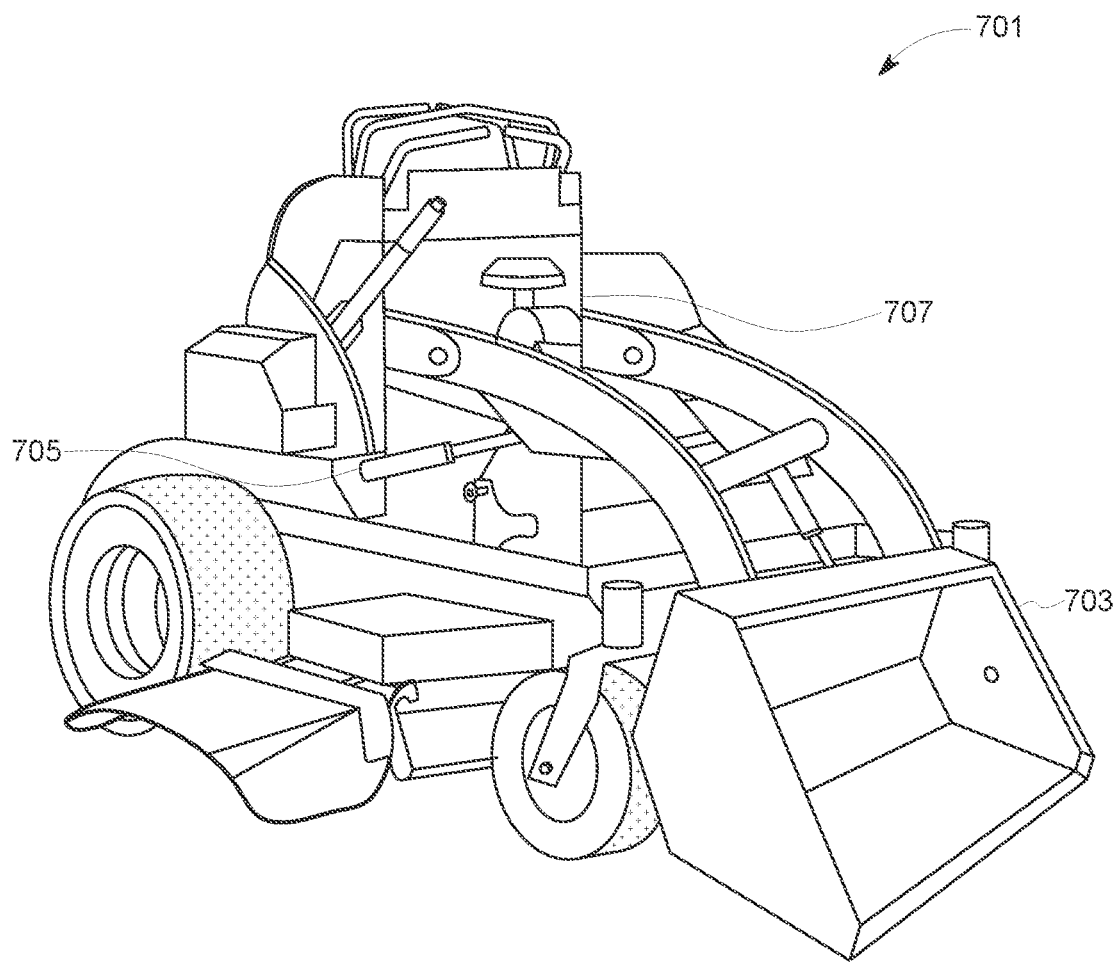
FIGS. 4 and 5 are side perspective views of alternative embodiments of the invention of the present application.
Figure 5:
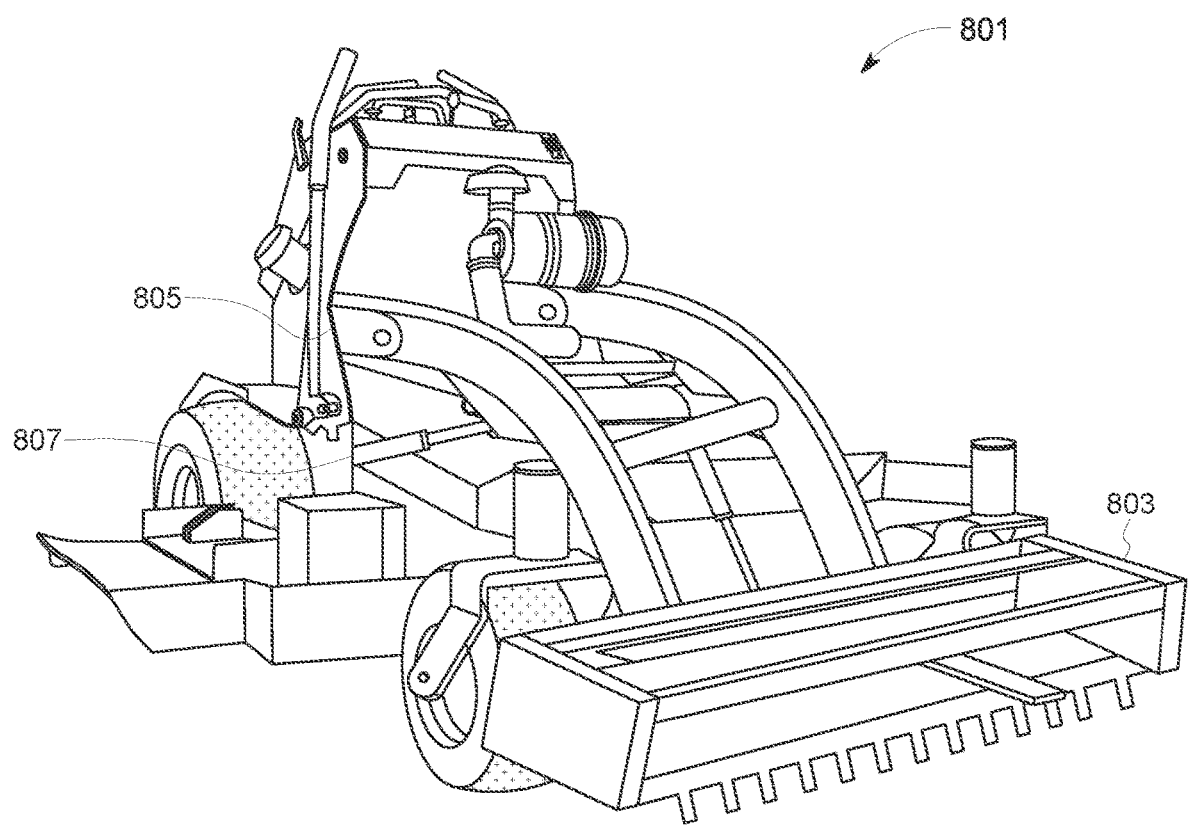

Referring now to FIGS. 4 and 5, alternative embodiments of zero-turn mowers adapted to operate a tool that is attached at the mid-point and rear. For example, embodiment 701 includes a bucket 703 attached at a lower rear-point 705 and an upper rear-point 707. While embodiment 801 includes shows the scrapper 803 attached at a lower mid-point 807 and an upper rear-point 805.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed:

1. A mower tooling system comprising:
   a zero-turn mower having:
      a body having a front end section, a middle section, and a back end section;
      a handle to manipulate the movement of the body, the handle is positioned near the back end section; and
      a mower deck secured to the body at the middle section;
   at least one joint secured to the body near the back end section;
   at least one tool, the tool having:
      two boom arms that pivotally secured to the body via the at least one joint secured to the back end section; and
      a bucket pivotally attached to and removable from the two boom arms, the bucket is positioned at the front end of the body and the two boom arms extend from the back end section to the front end section; and at least one control that is secured to the handle, the at least one control is configured to operate the at least one tool;

wherein the use of the zero-turn mower is not inhibited by the at least one tool.

2. The system of claim 1 wherein the tool is a front-loader.

* * * * *